(12) United States Patent
Steudle

(10) Patent No.: US 7,133,382 B2
(45) Date of Patent: Nov. 7, 2006

(54) DEFINING MEASUREMENT GAPS IN INTER-FREQUENCY MEASUREMENT

(75) Inventor: Ville Steudle, Turku (FI)

(73) Assignee: Nokia Mobile Phones, Ltd., Espoo (FI)

( * ) Notice: Subject to any disclaimer, the term of this patent is extended or adjusted under 35 U.S.C. 154(b) by 823 days.

(21) Appl. No.: 09/792,455

(22) Filed: Feb. 23, 2001

(65) Prior Publication Data

US 2002/0006119 A1    Jan. 17, 2002

(30) Foreign Application Priority Data

Feb. 29, 2000    (FI)    ................................. 20000463

(51) Int. Cl.
*H04Q 7/00*    (2006.01)
(52) U.S. Cl. ...................................... 370/331; 370/458
(58) Field of Classification Search ................ 370/311, 370/328, 329, 330, 331, 335, 342, 437, 441, 370/458
See application file for complete search history.

(56) References Cited

U.S. PATENT DOCUMENTS

| | | | |
|---|---|---|---|
| 5,068,916 A * | 11/1991 | Harrison et al. ............... 455/39 |
| 5,177,740 A * | 1/1993 | Toy et al. .................... 370/337 |
| 5,479,410 A * | 12/1995 | Paavonen ................... 370/332 |
| 5,533,014 A | 7/1996 | Willars et al. ................. 370/18 |
| 5,722,074 A * | 2/1998 | Muszynski .................. 455/442 |
| 5,883,899 A | 3/1999 | Dahlman et al. ........... 370/468 |
| 5,978,365 A * | 11/1999 | Yi .............................. 370/331 |
| 6,272,118 B1 * | 8/2001 | Wewers et al. ............. 370/330 |
| 6,339,612 B1 * | 1/2002 | Stewart et al. ............. 375/140 |
| 6,463,076 B1 * | 10/2002 | Suzuki ........................ 370/459 |
| 6,584,116 B1 * | 6/2003 | Gourgue et al. ............ 370/442 |
| 6,810,019 B1 * | 10/2004 | Steudle ....................... 370/252 |
| 7,020,108 B1 * | 3/2006 | Virtanen ..................... 370/331 |

FOREIGN PATENT DOCUMENTS

| | | |
|---|---|---|
| EP | 0876008 | 11/1998 |
| EP | 0949768 | 10/1999 |
| EP | 1091515 | 4/2001 |
| WO | WO 9859513 A1 * | 12/1998 |
| WO | WO 01/20942 | 3/2001 |

OTHER PUBLICATIONS

Mayer, J. et al., "Handoff Protocols in JD-CDMA," The Ninth IEEE International Symposium on Personal, Indoor and Mobile Radio Communications. Sep. 1998. vol. 1, pp. 355-359.*

(Continued)

*Primary Examiner*—Seema S. Rao
*Assistant Examiner*—Donald L Mills
(74) *Attorney, Agent, or Firm*—Perman & Green, LLP

(57) ABSTRACT

A method for defining measurement gaps and a wireless telecommunications system comprising at least one base station and at least one wireless terminal. In the data transfer between these two, measurement gaps are generated with one of the following measurement gap generation methods: puncturing the data being transmitted, halving the spreading factor, or buffering the data being transmitted onto higher protocol layers. In the method, measurement pattern parameters that set the locations of the gaps used for measurements in the time-slot frames and determine the measurement gap generation method are defined for the terminal and transmitted to the terminal through the base station. A uniform measurement gap is defined for the terminal, which comprises time-slots from two different time-slot frames so that the gaps in different time-slot frames are generated with a different measurement gap generation method.

19 Claims, 4 Drawing Sheets

OTHER PUBLICATIONS

Whinnett, N.W., "Handoff Between Dissimilar Systems: General Approaches and Air Interface Issues for TDMA Systems,". IEE Vehicular Technology Conference. Jul. 25-28, 1995. vol. 2, pp. 953-957.*

3G TS 25.215, version 3.1.1, chapter 6.1, "UE Measurements", 1999, 2 page document.

3G TR 25.922, version 3.0.0, chapter 5, "RRC Connection Mobility", 1999, 30 page document.

"Universal Mobile Telecommunications System (UMTS); Multiplexing and Channel Coding (FDD) (3G TS 25.212 version 3.1.1 Release 1999)", ESTI TS 125 212 V.3.1.1. (Jan. 2000).

* cited by examiner

DEFINING MEASUREMENT GAPS IN INTER-FREQUENCY MEASUREMENT

BACKGROUND OF THE INVENTION

1. Field of the Invention

The invention relates to measuring inter-frequencies in a mobile telephone system employing frequency division duplex (FFD) and especially to defining measurement gaps generated for making said measurements in a code division multiple access (CDMA) system.

2. Brief Description of Related Developments

Third-generation mobile telephone systems called UMTS (Universal Mobile Telephone System) and IMT-2000 (International Mobile Telephone System), for instance, will use wideband code division multiple access technology, i.e. WCDMA technology, on the radio path. In a WCDMA system, all mobile stations in a cell use the same frequency between each other on the transmission link from the mobile station to the base station and correspondingly, the same frequency between each other on the transmission link from the base station to the mobile station. A WCDMA system can in mobile telephone systems be implemented either as frequency division duplex (FDD) or time division duplex (TDD).

In an FDD-type WCDMA system, the uplink direction (from the mobile station to the base station) and the downlink direction (from the base station to the mobile station) transmissions are independent of each other. Thus, the base stations need not be synchronized with respect to each other, either. It is, however, typical of CDMA systems that a downlink transmission is performed simultaneously from several base stations to one mobile station, which transmission the receiver of the mobile station is arranged to receive. This arrangement is called a soft handover, and to control it, the mobile station must perform various parameter measurements for both uplink and downlink connections. Corresponding measurements are also used in updating the location of a mobile station and in handovers between WCDMA and GSM systems.

The receiver of a mobile station is typically arranged to receive only one frequency at a time, which means that one set of receiving means is enough for the mobile station and there is no need to design antenna diversity to them, which is advantageous both in view of cost and making the structure of the mobile station simple. The mobile station can also be designed to comprise several receiving means (dual receiver), which usually include antenna diversity. This type of mobile station is, however, more expensive and complex to implement.

Thus, the parameter measurements described above can be performed in a typical one-receiver mobile station only when there is no transmission. This also applies to dual-receiver mobile stations when one set of transmission/reception means transmits on almost the same frequency as a second set of transmission/reception means performs measurements. In an FDD-type WCDMA system, the transmission is interrupted for a while by generating in a frame a gap during which transmission is interrupted. This is done by using what is known as compressed mode or slotted mode in which information normally transmitted in a 10-ms frame is transmitted in a shorter time. Since the same information is transmitted in a shorter time, a gap remains in the frame, during which measurements of the parameters described above can then be performed. Depending on the measurement situation and the transmitter properties, compressed mode is only used in uplink or downlink transmissions, or a combined uplink/downlink compressed mode can also be used.

In compressed mode, a gap can be generated into the transmission in at least three ways: by puncturing the data being transmitted, by halving the spreading factor, or by buffering the data being transmitted onto higher protocol layers for a while. One of the above compressed mode methods is signalled to the mobile station for use. Up to a third of the transmitted bits can be removed with the puncturing methods used in a WCDMA system, whereby a gap of up to five time-slots can in compressed mode be generated into a frame comprising 15 time-slots. A gap of this length is, however, often impossible to generate, because puncturing is also used to adapt data rates in an ordinary transmission, which means that this takes up a part of the puncturing capacity and the compressed mode gap becomes shorter than five time-slots. By halving the spreading factor, it is possible to double the data rate, and a gap of up to seven time-slots can be generated in a frame of 15 time-slots. In such a case, transmission power must be increased to keep the signal-to-interference ratio of the received signal substantially constant. Buffering data onto higher protocol layers is only possible with non-real-time connections, such as with packet data transmissions having low quality of service (QoS).

A problem with the above arrangement is that in most measurements, such as in handover measurements between UMTS and GSM, for instance, a longer measurement gap would be more advantageous than the gap of at most seven time-slots mentioned above. A longer gap can be generated by placing two gaps after each other so that the first gap is at the end of the first time-slot frame and the second gap is at the beginning of the next time-slot frame. When using the puncturing method, it is this way possible to generate a gap of at most 10 time-slots, but maximum puncturing is not always possible in compressed mode, due to a possible data rate adaptation. By halving the spreading factor, it is possible to generate a gap of up to 14 time-slots, but then the transmission rate must be increased during two frames, which causes interference to the transmissions of other mobile stations in the same cell and consequently, they, too, need to increase their transmission power to compensate for the interference. Buffering data onto higher layers cannot be used with real-time connections.

SUMMARY OF THE INVENTION

The object of the invention is to develop an improved method for defining measurement gaps and an apparatus implementing the method. The object of the invention is achieved by a method for defining measurement gaps in a wireless telecommunications system comprising at least one base station and at least one wireless terminal, the measurement gaps in the data transfer between these two being generated in several alternative ways. The method comprises: defining measurement pattern parameters which determine the manner of generating the measurement gap for the terminal, and sending the measurement pattern parameters to the terminal through the base station. The method is characterized by defining a uniform measurement gap for said terminal, the gap comprising measurement gaps formed by consecutive time-slots in two different time-slot frames so that the measurement gaps in the first and second time-slot frames are generated with a different measurement gap generation method.

The invention also relates to a wireless telecommunications system comprising at least one base station and at least one wireless terminal, the measurement gaps in the data transfer between these two being generated in several alternative ways. The telecommunications system is arranged to define measurement pattern parameters for the terminal, which determine the manner of generating the measurement gap, and to send the measurement pattern parameters to the terminal through the base station. The telecommunications system is characterized by being arranged to define for said terminal a uniform measurement gap which comprises measurement gaps formed by consecutive time-slots in two different time-slot frames so that the measurement gaps in the first and second time-slot frames are generated with a different measurement gap generation method.

The invention further relates to a terminal of a wireless telecommunications system, the terminal comprising a receiver for receiving measurement pattern parameters defined by the telecommunications system and processing means for arranging gaps into a time-slot frame according to the measurement pattern parameters. The terminal is characterized in that said processing means are also arranged to generate a uniform measurement gap comprising measurement gaps formed by consecutive time-slots in two different time-slot frames so that the first and second time-slot frames are generated with a different measurement gap generation method.

The invention also relates to a base station of a wireless telecommunications system, the base station having operationally connected to it means for defining measurement pattern parameters for terminals, the measurement pattern parameters selecting the manner of generating a measurement gap from several different alternatives, and the base station comprising a transmitter for transmitting the measurement patterns to the terminals. The base station is characterized in that said means for defining measurement pattern parameters, operationally connected to the base station, are arranged to define for said terminal a uniform measurement gap comprising measurement gaps formed by consecutive time-slots in two different time-slot frames so that the measurement gaps in the first and second time-slot frames are generated with a different measurement gap generation method.

The invention is based on the idea that especially in measurements performed in compressed mode, in which the required measurement gap comprises time-slots of two consecutive time-slot frames, the measurement gaps in different time-slot frames are generated with different gap generation methods. The method is typically one of the following: puncturing data being transmitted, halving the spreading factor, or buffering the data being transmitted onto higher protocol layers. Other possible measurement gap generation methods can also be used.

The method and system of the invention provide the advantage that by limiting the use of the method halving the spreading factor to one time-slot frame only, the interference caused by mobile stations to the system by a higher transmission power is reduced. This provides the further advantage that the average transmission power of the system remains low, thus improving the capacity of the system. Another advantage is that the method can also be used to generate short measurement gaps.

BRIEF DESCRIPTION OF THE FIGURES

In the following, the invention will be described in greater detail by means of preferred embodiments and with reference to the attached drawings, in which.

DETAILED DESCRIPTION OF THE INVENTION

The invention can be used in all wireless telecommunications systems in which measurement gaps are generated in a transmission for the purpose of performing various measurements. The examples describe the use of the invention in a universal mobile telephone system employing wideband code division multiple access, without restricting the invention to it, however.

Figure 1:
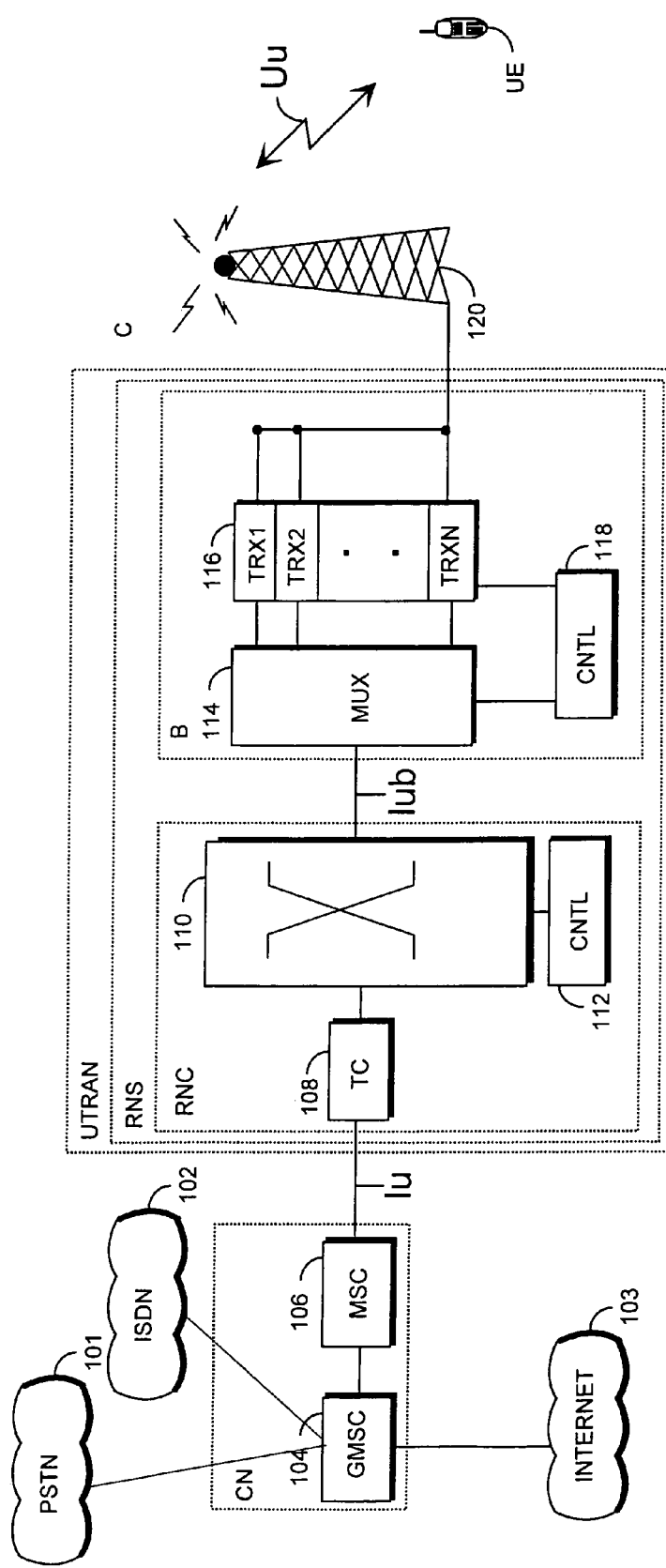
FIG. 1 shows the structure of an UMTS mobile telephone system in a simplified block diagram.

The structure of an UMTS mobile telephone system is described with reference to FIG. 1. FIG. 1 only contains the blocks essential for explaining the invention, but it is obvious to a person skilled in the art that a conventional mobile telephone system also comprises other functions and structures, which need not be described in greater detail herein. The main parts of a mobile telephone system are a core network CN, a UMTS mobile telephone system terrestrial radio access network UTRAN, and a mobile station or user equipment UE. The interface between CN and UTRAN is referred to as Iu and the air interface between UTRAN and UE is referred to as Uu.

UTRAN typically comprises radio network subsystems RNS, the interface between the RNSs being referred to as Iur (not shown). A radio network subsystem RNS comprises a radio network controller RNC and one or more nodes B. The interface between RNC and B is referred to as Iub. The service area, i.e. cell, of node B is indicated with C in FIG. 1.

The user equipment UE can, for instance, be a fixed or a portable terminal or one installed in a vehicle. The infrastructure UTRAN of the radio network comprises radio network subsystems RNS, i.e. base station systems. The radio network subsystem RNS comprises a radio network controller RNC, i.e. a base station controller, and at least one node B, i.e. base station, under its control.

The base station B has a multiplexer 114, transceivers 116 and a control unit 118 which controls the operation of the transceivers 116 and the multiplexer 114. With the multiplexer 114, the traffic and control channels used by several transceivers 116 are placed in the transmission link Iub.

The transceivers 116 of the base station B are connected to an antenna unit 120 with which a bi-directional radio link Uu is implemented to the user equipment UE. The structure of the frames being transmitted over the bi-directional radio link Uu is clearly specified.

The radio network controller RNC comprises a group switching field 110 and a control unit 112. The group switching field 110 is used for speech and data connection and to connect signalling circuits. The base station system formed by the base station B and the radio network controller RNC also comprises a transcoder 108. Work distribution between the radio network controller RNC and the base station B as well as their physical structure can vary depending on implementation. Typically, the base station B takes care of the radio path implementation as described above. The radio network controller RNC typically takes care of the following: management of radio resources, control of handover between cells, power adjustment, timing and synchronization, paging the subscriber terminal.

The transcoder 108 is usually located as close as possible to a mobile switching center 106, because speech can then be transmitted in mobile telephone system format between the transcoder 108 and the radio network controller RNC, saving transmission capacity. The transcoder 108 converts the different digital coding formats of speech used between the public switched telephone network and the mobile telephone network to be compatible with each other, for instance from the 64 kbit/s format of a public network to another (e.g. 13 kbit/s) format of a cellular network and vice versa. The hardware required is not described in detail herein, but it should be noted that other data than speech is not converted in the transcoder 108. The control unit 112 takes care of call control, mobility management, collection of statistics, and signalling.

The core network CN comprises an infrastructure belonging to a mobile telephone system and external to UTRAN. FIG. 1 describes two of the components in a core network CN, i.e. a mobile switching center 106 and a gateway mobile switching center 104 which handles the connections of the mobile telephone system to the outside world, such as to a public analogue telephone network (PSTN, public switched telephone network) 101 or a digital telephone network (ISDN, integrated services digital network) 102 or to the Internet 103. It should be noted that the UMTS system is designed so that the core network CN can be identical with that of the GSM system, thus making it unnecessary to rebuild the entire network infrastructure.

Figure 2:
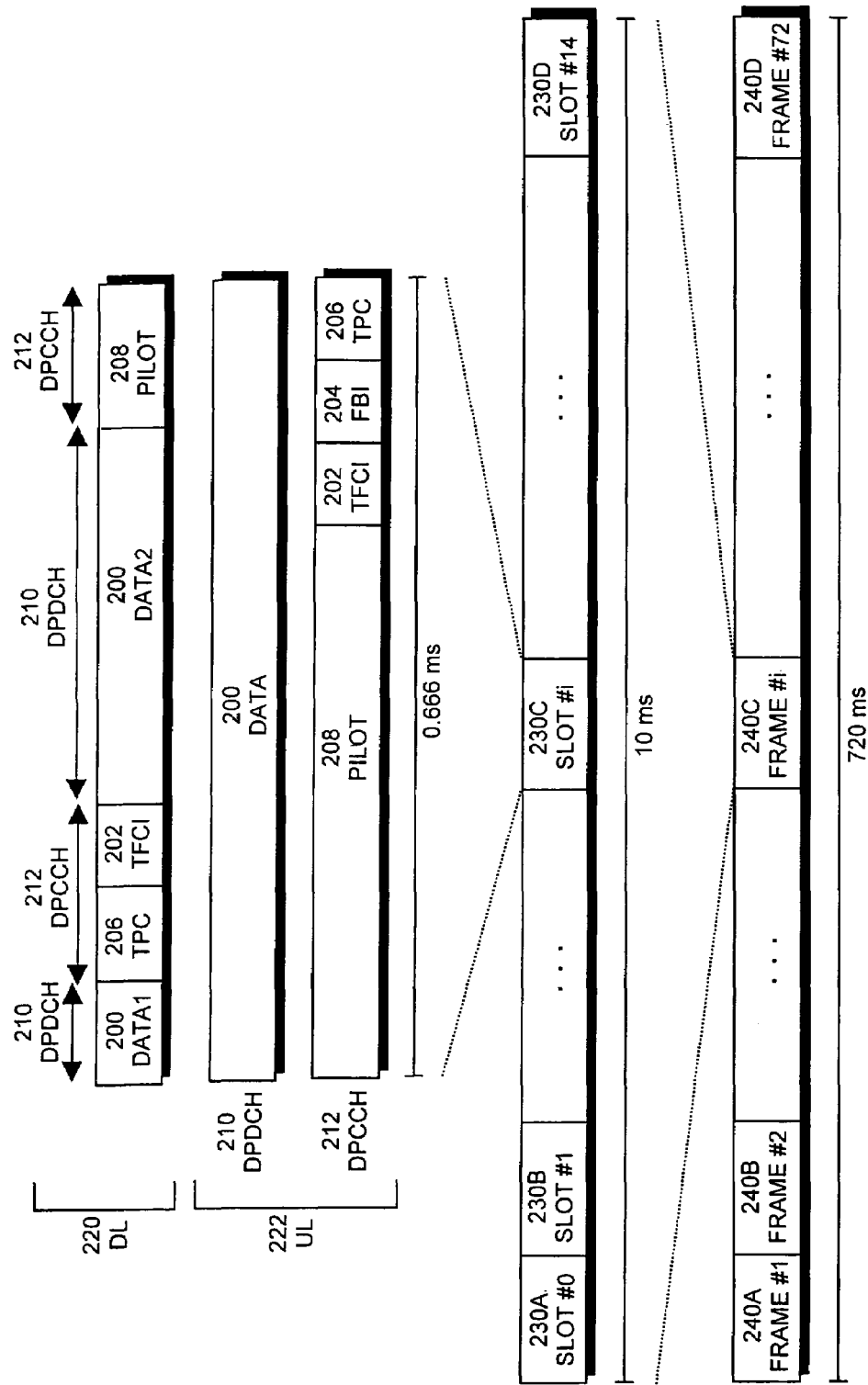
FIG. 2 shows a frame structure used on the radio link of a WCDMA system.

FIG. 2 shows the frame structure of an FDD-type WCDMA system in a physical channel. Frames 240A, 240B, 240C, 240D are numbered sequentially from 1 to 72, and they form a 720-millisecond long super frame. The length of this super frame is a multiple of the multi-frame of the GSM system (6×120 ms) which, for its part, makes it possible to use the GSM core network in a WCDMA system. The length of one frame 240 is 10 milliseconds. Frame 240 is divided into fifteen (0 to 14) slots 230A, 230B, 230C, 230D. The length of one slot 230C is 2560 chips, i.e. 0.666 milliseconds. One slot 230 typically corresponds to one power adjustment period during which power is adjusted one decibel up or down, for instance.

Physical channels are divided into two groups: common physical channels and dedicated physical channels.

The following transport channels are transmitted in the common physical channels: PCH (paging channel), BCH (broadcast channel, RACH (random access channel) and FACH (forward access channel).

Dedicated physical channels comprise dedicated physical data channels (DPDCH) 210 and dedicated physical control channels (DPCCH) 212. Dedicated physical data channels 210 are used to transmit dedicated control channels, i.e. data 200 which is generated on the second layer of OSI (Open Systems Interconnection) and above. Dedicated physical control channels 212 transmit control information generated on the first layer of OSI. Control information comprises at least pilot bits 208 used in channel estimation, feedback information (FBI) 204, transmit power control commands (TPC) 206, and optionally a transport format combination indicator (TFCI) 202. The transport format combination indicator 202 indicates to the receiver the transmission formats of the different transport channels, i.e. the transport format combination, used in the frame in question.

As shown in FIG. 2, on the downlink, the dedicated physical data channels 210 and the dedicated physical control channels 212 are time-multiplexed to the same slot 230C. However, on the uplink, the channels in question are transmitted parallel so that they are IQ/code-multiplexed to each frame 240C.

Information transmitted in CDMA systems is multiplied by a spreading factor, whereby a relatively narrowband information is spread to a wide frequency band. Each link Uu has its own spreading factor by which the receiver identifies transmissions meant for it. Typically, it is possible to simultaneously use at most two hundred and fifty six different spreading factors orthogonal with respect to each other. If a carrier of 4.096 megachips, for instance, is used, spreading factor 256 corresponds to a transmission rate of 32 kilobits per second. Correspondingly, the highest practical transmission rate is achieved with spreading factor four with which the data transmission rate is 2048 kilobits per second. The transmission rate in the channel varies thus step by step, 32, 64, 128, 256, 512, 1024, and 2048 kbit/s, while the spreading factor changes correspondingly, 256, 128, 64, 32, 16, 8, and 4. In other words, when the spreading factor is halved, the data transmission rate of the channel doubles. The data transmission rate available to the user depends on the channel coding used. For instance, when using ⅓ convolution coding, the data transmission rate of the user is approximately one third of the data transmission rate of the channel.

The spreading factor can indicate the length of the spreading code. For instance, the spreading code corresponding to spreading factor one is (1). Spreading factor two has two mutually orthogonal spreading codes (1,1) and (1,−1). Further, spreading factor four has four mutually orthogonal spreading codes: under the higher-level spreading code (1,1), there are spreading codes (1,1,1,1) and (1,1,−1,−1), and under the second higher-level spreading code (1,−1), there are spreading codes (1,−1,1,−1) and (1,−1,−1,1). The spreading codes of a certain level are usually orthogonal with respect to each other, as when using the Walsh-Hadamard code set, for instance.

The number of mutually orthogonal spreading codes is typically limited, which correspondingly, sets limitations on the capacity of the data transmission connections being used. The data transmission connections and their capacity can be increased by using several scrambling codes with which the information to be transmitted is scrambled before transmission. However, using several scrambling codes on a downlink connection, for instance, typically results in loosing the orthogonality of the data transmission connections, whereby the data transmission connections cause interference to each other and thus correspondingly decrease the available capacity.

In puncturing, a certain number of bits is removed, typically after convolution or turbo coding, according to a predefined scheme from the information to be transmitted. Because the receiver knows the scheme used in puncturing, it can generate the missing bits on the basis of the received information. Reliable data transmission, however, requires that limitations are set on how many bits can be removed from the information to be transmitted so as to make it possible to generate the missing information on the basis of the received information. In an FDD-type UMTS system, for instance, a ⅓ coding scheme can be used, in which approximately 33% of the transmitted bits can be removed and still guarantee a reliable reception of information.

The coding scheme thus defines a maximum number of bits that can be removed from transmitted information. Because in an FDD-type UMTS system puncturing is often used in normal data transmission to adapt the data transmission rates according to the current capacity of the system, a part of the maximum puncturing capacity is used up by this. For instance, if x% of the bits is removed in puncturing used for adapting the data transmission rate, it is possible to puncture at most (33−x)% of the bits when using the ⅓ coding scheme in compressed mode. The generated gap is then also shorter than five time-slots.

When buffering the data to be transmitted onto higher protocol layers, the higher protocol layers set limitations on the transport format combinations TFC being used in such a manner that only a certain set of transport format combinations is available for use. In such a case, the maximum number of bits being transmitted to the physical layer is known, thus enabling the generation of gaps in compressed mode.

The compressed mode of an FDD-type WCDMA system uses measurement gaps having a length of 3, 4, 5, 7, 10 or 14 time-slots. Gaps of 7 or 14 time-slots are used for internal measurements of the WCDMA system, but all above-mentioned gap lengths can be used in measurements between WCDMA and GSM. A 10-time-slot gap is especially advantageous for measurements of the GSM system, because its length matches well the frame structure of the GSM system.

Figure 3:
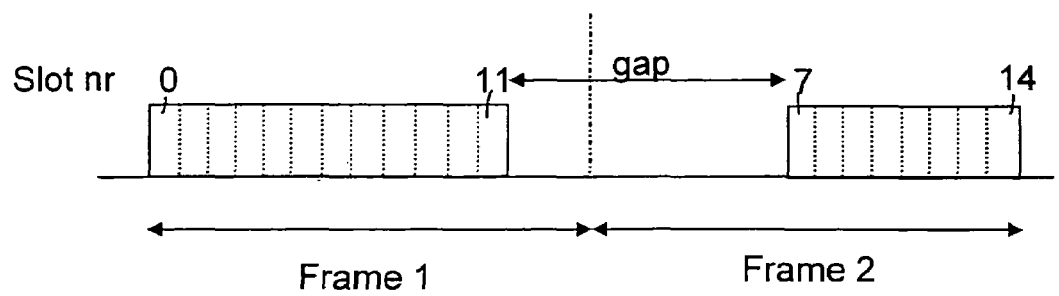
FIG. 3 illustrates the generation of a measurement gap of the invention.

The above-mentioned long measurement gaps can be generated only with what is known as the double frame method in which two gaps are placed after each other so that the first gap is placed at the end of the first frame and the second gap at the beginning of the next frame. This is illustrated in FIG. 3 in which the first frame comprises information being transmitted in 12 time-slots (time-slots 0 to 11), in which case a gap of three time-slots (12 to 14) is generated at the end of the frame. The gap continues in the next frame for seven time-slots (0 to 6) and information is again transmitted in time-slots 7 to 14. Thus, a gap comprising 10 time-slots is generated for a time interval of two frames. The double frame method can also be used to generate shorter gaps. Several compressed mode parameters which determine the generation of measurement gaps for various measurements are signalled to the mobile station.

These parameters include connection frame number (CFN) which defines the number of the time division frame in which the application of the compressed mode is started, transmission gap starting slot number (TGSN) which defines the time-slot of the 15 time-slots in the frame in question, from which the gap starts, transmission gap length 1/2 (TGL 1/2) which defines how long the gap is as a number of time-slots, transmission gap distance (TGD) which is the distance between two consecutive gaps, and transmission gap pattern length 1/2 (TGPL 1/2) which defines the number of the consecutive frames which comprise one or two gaps. In addition, one signalled parameter is the compressed mode method to be used, i.e. gap generation method. It should be noted that in defining compressed mode, many other parameters are also used. For a more detailed description of them, reference is made to the document *3G TS 25.215, version 3.1.1, chapter 6.1, "UE measurements"*.

In a preferred embodiment of the invention, the user equipment UE is arranged to generate long measurement gaps, such as the above-mentioned gaps comprising 10 time-slots, by the double frame method so that different methods for generating the gaps are used for gaps in different frames. Thus, a gap in a first frame can be generated by halving the spreading factor, for instance, and a gap in a second frame by puncturing, or vice versa. By taking the limitations caused by a real-time connection into consideration, it is also possible to use data buffering onto higher layers as the method. This eliminates the need to increase the transmission power in both frames caused by halving the spreading factor and consequently, reduces the interference caused by increasing the transmission power.

In the following, various embodiments are described by means of examples. For instance, for a handover between UMTS and GSM, a fixed network UTRAN asks user equipment UE to perform measurements of GSM system parameters and in many of these measurements, it is advantageous to use a gap of 10 time-slots. In such a case, the fixed network UTRAN signals to the user equipment UE monitoring settings for the handover and compressed mode parameters to be used for the necessary measurements. The compressed mode parameters comprise a gap generation method, for instance. To generate a gap of 10 time-slots, the double frame method should be used, in which case the fixed network UTRAN can, in the compressed mode parameters, preferably define different gap generation methods for the first frame and the second frame used in gap generation. The attached table illustrates the various alternatives in generating a gap of 10 time-slots.

|    | Frame 1<br>No. of time-slots<br>(method) | Frame 2<br>No. of time-slots<br>(method) |
|----|------------------------------------------|------------------------------------------|
| #1 | 7 (H)                                    | 3 (P)                                    |
| #2 | 6 (H)                                    | 4 (P)                                    |
| #3 | 4 (P)                                    | 6 (H)                                    |
| #4 | 3 (P)                                    | 7 (H)                                    |

The table shows the gap lengths generated in consecutive frames in the double frame method as time-slots, and the method with which the gaps are generated in different frames. In the first alternative (#1) a gap of 7 time-slots is generated at the end of the first frame by halving the spreading factor (H). A gap of 3 time-slots is generated at the beginning of the second frame by puncturing (P), and this gap together with the gap in the first frame form a measurement gap comprising 10 time-slots, in which spreading factor halving is preferably used in only one frame. Correspondingly, in the second alternative (#2), the gap lengths are six and four time-slots while the frame-specific gap generation methods remain the same.

In the third alternative (#3), a gap of four time-slots is generated at the end of the first frame by puncturing (P), and a gap of six time-slots is generated at the beginning to the second frame by halving the spreading factor (H), and together they form a gap comprising 10 time-slots, in which spreading factor halving is again preferably used in only one frame. Correspondingly in the fourth alternative (#4), the lengths of the gaps are three and seven time-slots.

In an embodiment, the various double frame methods signalled to the user equipment UE comprise not only the above-mentioned methods of prior art, but also a combination method of the invention. The different alternatives can also be coded, according to the above table, for instance, and the fixed network UTRAN also signals to the user equipment UE with the compressed mode parameters the code of the double frame method to be used. Alternatively, the fixed network can signal the gap generation method and number of time-slots in the gap separately for each frame.

According to an embodiment, the above-mentioned double frame method can also be used to generate shorter gaps. In this case, a gap of three time-slots, for instance, can be generated at the end of the first frame by halving the spreading factor, and a gap of four time-slots, for instance, at the beginning of the second frame by puncturing, which produces a gap comprising seven time-slots which is generally used in internal measurements in the WCDMA system. The method is thus not in any way limited to the length of the gaps; the essential thing is to use different gap generation methods in consecutive frames. This method, too, provides the advantage of reducing the interference caused by halving the spreading factor.

The above describes how the invention is applied to measurements between UMTS and GSM as one example of a typical parameter measurement in compressed mode. It should be noted that the 3GPP specification also defines in a corresponding manner other parameter measurements in compressed mode, such as measurements for an internal (inter-frequency) WCDMA system handover, to which the method of the invention can also be applied. For a more detailed description of these measurements, reference is made to the document 3*G TR 25.922, version* 3.0.0., *chapter 5, "RRC Connection Mobility"*. In addition, the measurement gaps defined according to the invention are not limited to measurements in WCDMA or GSM systems, nor are the measurement gap generation methods limited to the above examples. Any measurements, such as location positioning by means of the global positioning system, can be performed during gaps. Other possible measurement gap generation methods can also be used.

Figure 4:
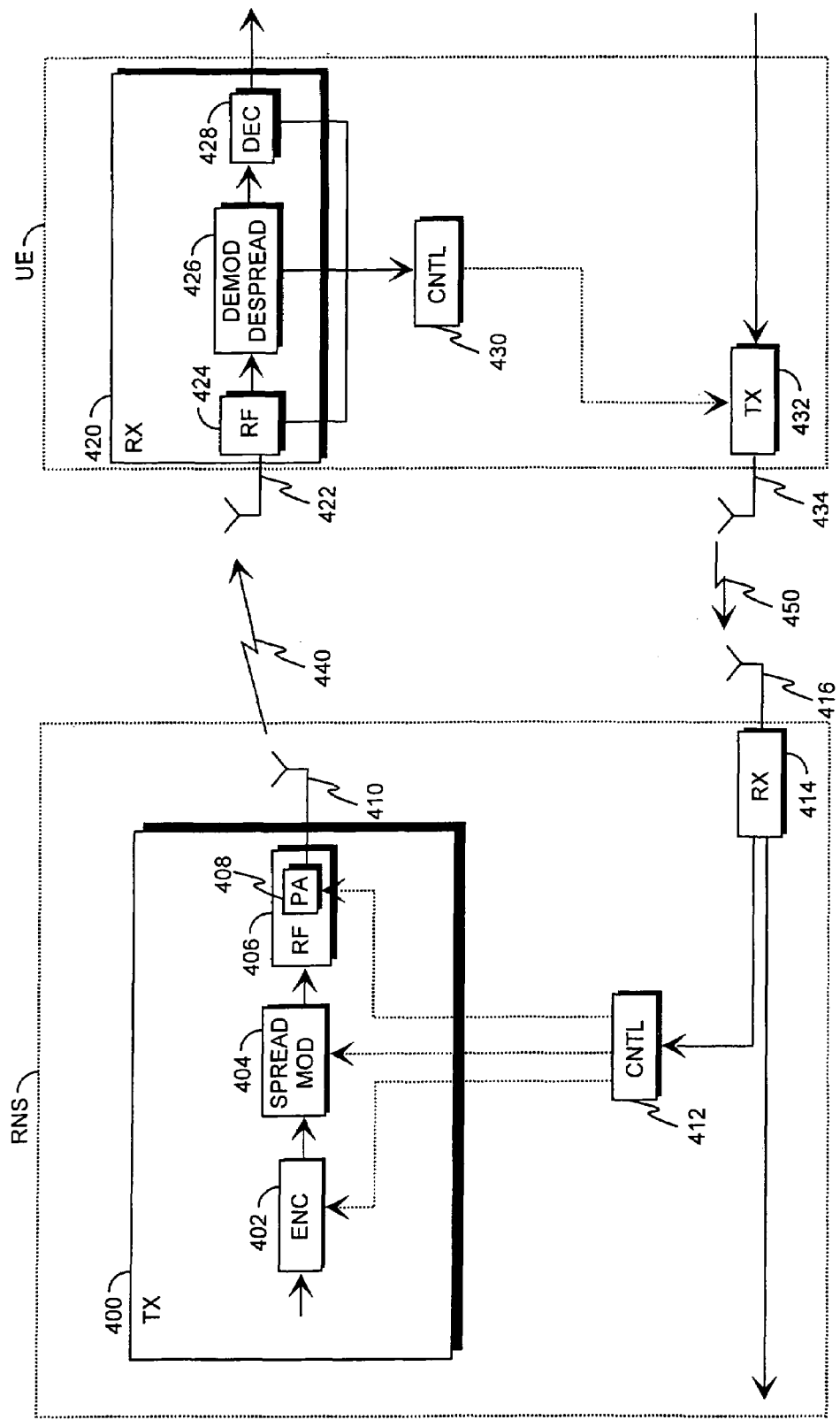
FIG. 4 shows the structure of a radio system and mobile station of the invention.

FIG. 4 describes the parts essential for the invention in a radio network subsystem RNS and user equipment UE. A control part 412 of a radio transmitter 400 processes various control channels and services of the system located in a physical channel, such as speech, data, moving or still video image. Different services require different source coding means, for instance speech requires a speech codec. For clarity's sake, the source coding means are, however, not shown in FIG. 4.

In a channel coder 402, the information transmitted through the physical channel is channel-coded, in which convolution coding and its different variations, such as turbo coding, are typically used. Channel coding also includes various block codes, such as the CRC check (cyclic redundancy check) and the Reed-Solomon code.

Interleaving is not shown in FIG. 4. The purpose of interleaving is to facilitate error correction. In interleaving, the bits of the signal are scrambled in a certain manner among themselves, after which a momentary fade on the radio path does not necessarily yet make the transmitted information unidentifiable.

The signal is spread with a spreading code and modulated in block 404. The information transmitted in the service is multiplied by a spreading code, whereby a relatively narrowband information is spread to a wide frequency band. Each link Uu has its own spreading code by which the receiver identifies transmissions meant for it. The pulse format of the spread signal can be filtered, after which the signal is modulated to a radio frequency carrier by multiplying it with the carrier. The obtained signal is then ready to be transmitted to the radio path Uu, excluding any possible filtering and power amplification.

The modulated signal is forwarded to radio frequency parts 406 which comprise a power amplifier 408. The radio frequency parts 406 can also comprise filters limiting bandwidth. An analogue radio signal 440 is then transmitted to the radio path Uu through an antenna 410.

The radio receiver 420 is typically a Rake receiver. An analogue radio frequency signal 440 is received from the radio path Uu with an antenna 422. The signal 440 is forwarded to radio frequency parts 424 comprising a filter which prevents all frequencies outside the desired frequency band. After this, the signal is converted in a demodulator 426 to an intermediate frequency or directly to a base band, and the thus converted signal is then sampled and quantized.

As the signal in question is a multi-path propagated signal, the aim is to combine the multi-path propagated signal components in block 426 which comprises several Rake fingers according to prior art. Delays are searched for each multi-path propagated signal component in a rowing Rake finger. When the delays have been found, different Rake fingers are allocated to receive each its own multi-path propagated signal component. During reception, the received signal component is correlated with the used spreading code which has been delayed by the delay found for the multi-path in question. The different demodulated and de-spread multi-path propagated components of the same signal are combined to produce a stronger signal.

Next, the signal is forwarded to a channel decoder 428 in which the channel coding, for instance block coding and convolution coding, used in the transmission is decoded. Convolution coding is preferably decoded with a Viterbi decoder. The thus obtained originally transmitted information is then forwarded to user equipment UE for further processing.

In block 430, a quality value of the received signal is measured, such as that of the inter-frequency measurement during gaps in compressed mode. The measurements relate to channel conditions, such as channel parameters, signal reception level, bit error ratio, SINR ratio (signal/interference+noise ratio), SIR ratio (signal/interference ratio), C/I ratio (carrier/interference ratio) or any other known way of measuring the channel quality.

The user equipment UE also comprises a transmitter 432 and an antenna 434 which have their counterparts, a receiver 414 and an antenna 416, in the radio network subsystem RNS for receiving the analogue messages 450 transmitted by the user equipment UE. The transmitter 432 and receiver 414 are in structure similar to the transmitter 400 and receiver 420 described above.

The above description of the radio network subsystem RNS and user equipment UE corresponds to the structure of the UMTS mobile telephone system.

The invention can be implemented in all corresponding wireless telecommunications systems in which measurement gaps for performing various measurements are generated in the transmission and which comprise the means essential for the invention. Thus, the invention can be applied to various wireless local area networks WLAN, Internet protocol-based wireless networks or satellite systems, for instance. It is essential for the present invention that in the radio system of FIG. 4, the radio network subsystem RNS comprises control means 412 for defining different gap generation methods for consecutive frames in the parameters of compressed mode, the control means 412 also defining the lengths of said measurement gaps. In addition, the radio system, preferably its base station should comprise a transmitter 400 for transmitting the compressed mode parameters to the corresponding terminals. It is essential for the terminal of the invention that it comprises a receiver 420 for receiving the compressed mode parameters transmitted by the base station, and processing means 430 for arranging the gaps into the time-slot frame according to the compressed mode parameters, especially for using different gap generation methods in consecutive frames.

The invention is preferably implemented by software, whereby in the radio network subsystem RNS, a microprocessor is arranged to the base station B, for instance, or alternatively to the control means (118, 112) of the radio network controller RNC, in which microprocessor the compressed mode parameters are defined. The control means 118 of FIG. 1 thus correspond to the control means 412 of FIG. 4. Naturally, the invention can also be implemented by hardware providing the necessary functionality, for instance ASIC (application specific integrated circuit) or a separate logic. The necessary parameters can advantageously be defined on the basis of an algorithm or lookup table adapted for the purpose. A corresponding algorithm or lookup table is also applied to the processing means of the terminal.

It is obvious to a person skilled in the art that while technology advances, the basic idea of the invention can be implemented in many different ways. The invention and its embodiments are thus not restricted to the examples described above, but can vary within the scope of the claims.

What is claimed is:

1. A method for defining measurement gaps in a wireless telecommunications system comprising at least one base station and at least one wireless terminal, wherein gaps in a sequence of data transmission slots may have inadequate duration for a desired measurement of pattern parameters, the measurement gaps in a data transfer between the base station and the wireless terminal being generated by the method comprising the steps of:
   defining measurement pattern parameters which determine a generation method of a measurement gap for the terminal, and
   transmitting the measurement pattern parameters through the base station to the terminal, wherein
   a uniform measurement gap is defined for the terminal comprising measurement gaps formed by generating a first measurement gap composed of consecutive time-slots in the back end of a first of two consecutive time-slot frames, such that the last time-slot of said first measurement gap is the last time-slot of said first time-slot frame, and by generating a second measurement gap composed of consecutive time-slots in the front end of the second of the two consecutive time-slot frames, such that the first time-slot of said second measurement gap is the first time-slot of said second time-slot frame, so that the measurement gaps in the first and the second time-slot frames constitute the uniform measurement gap, and wherein
   the first measurement gap is generated by a first measurement gap generation method, and the second measurement gap is generated by a second measurement gap generation method that is different from the first measurement gap generation method.

2. A method as claimed in claim 1, wherein the measurement gap generation method comprises puncturing data being transmitted, halving a spreading factor, or buffering data being transmitted onto higher protocol layers.

3. A method as claimed in claim 2, wherein the step of halving the spreading factor is only used in one time-slot frame of the uniform measurement gap.

4. A method as claimed in claim 1, further comprising the step of using the method in a compressed mode of an FDD-type wideband code division multiple access system.

5. A method as claimed in claim 4, further comprising the steps of:
   defining a length of the measurement gap to be 10 time-slots and performing measurements directed to another telecommunications system, such as the GSM system, during the measurement gap.

6. A method as claimed in claim 1, further comprising the step of:
   defining a length of each of the first and the second measurement gaps and the different measurement gap generation methods for gaps in time-slot frames by software in a fixed network on the basis of a configured algorithm or lookup table.

7. A wireless telecommunications system comprising at least one base station and at least one wireless terminal for transfer of data between the base station and the wireless terminal, wherein gaps in a sequence of data transmission slots may have inadequate duration for a desired measurement of pattern parameters, wherein the system provides for a mode of the data transfer having measurement gaps generated by a process wherein the telecommunications system is operative:
   to define measurement pattern parameters determining a measurement gap for the terminal, and
   to send the measurement pattern parameters through the base station to the terminal, and wherein
   the telecommunications system is arranged to define for the terminal a uniform measurement gap comprising first and second measurement gaps each being formed by consecutive time-slots, and being located respectively in first and second consecutive timeslot frames, the first measurement gap being formed at the back end of the first time-slot frame such that the last timeslot of said first measurement gap is the last time-slot of said first time-slot frame, and the second measurement gap being formed at the front end of the second timeslot frame, such that the first time-slot of said second measurement gap is the first time-slot of said second time-slot frame, to constitute the uniform measurement gap, wherein
   the first measurement gap is generated by a first measurement gap generation method, and the second measurement gap is generated by a second measurement gap generation method that is different from the first measurement gap generation method.

8. A telecommunications system as claimed in claim 7, wherein
   the measurement gaps are arranged to be generated by the measurement gap generation method comprising puncturing data being transmitted, halving a spreading factor, or buffering data being transmitted onto higher protocol layers.

9. A telecommunications system as claimed in claim 8, wherein the measurement gap generation method comprising
   halving the spreading factor is only used in one time-slot frame of the uniform measurement gap.

10. A telecommunications system as claimed in claim 7, wherein the
    telecommunications system is an FDD-type wideband code division multiple access system having a compressed mode during which a definition of the measurement gap generation method is arranged to be performed.

11. A telecommunications system as claimed in claim 10, wherein
a length of the measurement gap is arranged to be 10 time-slots and the terminal is arranged to perform measurements directed to another telecommunications system, such as the GSM system, during the measurement gap.

12. A telecommunications system as claimed in claim 7, wherein
a means for defining a length of each of the measurement gaps and the different generation methods for the measurement gaps in the time-slot frames comprise an algorithm or lookup table configured by software.

13. A terminal for a wireless telecommunications system, comprising:
a receiver for receiving measurement pattern parameters defined by the telecommunications system;
and processing means for arranging gaps in successive time-slot frames according to the measurement pattern parameters, wherein
the processing means are arranged to generate a uniform measurement gap comprising first and second measurement gaps that are generated by consecutive time-slots respectively in first and second time-slot frames, the first measurement gap being formed at the back end of the first time-slot frame such that the last time-slot of said first measurement gap is the last time-slot of said first time-slot frame, and the second measurement gap being formed at the front end of the second time-slot frame, such that the first time-slot of said second measurement gap is the first time-slot of said second time-slot frame, to constitute the uniform measurement gap, wherein
the first measurement gap is generated by a first measurement gap generation method, and the second measurement gap is generated by a second measurement gap generation method that is different from the first measurement gap generation method.

14. A terminal as claimed in claim 13, wherein
the measurement gaps are arranged to be generated by the measurement gap generation method comprising puncturing data being transmitted, halving a spreading factor, or buffering the data being transmitted onto higher protocol layers.

15. A terminal as claimed in claim 14, wherein
the processing means are arranged to set the measurement gap generalization method comprising halving of the spreading factor to be used in only one time-slot frame of the measurement gap.

16. A terminal as claimed in claim 13, wherein
the terminal is a terminal in FDD-type wideband code division multiple access system having a compressed mode during which the measurement gaps are generated.

17. A base station serving for data transfer in a wireless telecommunications system, the base station being operative with means for defining measurement pattern parameters for terminals of the system, wherein gaps in a sequence of data transmission slots may have inadequate duration for a desired measurement of pattern parameters, the measurement pattern parameters being used by the base station for selecting a manner of generating a measurement gap in the data transfer, and the base station comprising a transmitter for transmitting the measurement patterns to the terminals,
wherein the means for defining measurement pattern parameters are arranged to define for an individual one of the terminals a uniform measurement gap comprising first and second measurement gaps that are formed by consecutive time-slots respectively in first and second time-slot frames, the first measurement gap being formed at the back end of the first time-slot frame such that the last time slot of said first measurement gap is the last time-slot of said first time-slot frame, and the second measurement gap being formed at the front end of the second time-slot frame, such that the first time-slot of said second measurement gap is the first time-slot of said second time-slot frame, to constitute the uniform measurement gap, wherein
the first measurement gap is generated by a first measurement gap generation method, and the second measurement gap is generated by a second measurement gap generation method that is different from the first measurement gap generation method.

18. A base station as claimed in claim 17, wherein
the means for defining measurement pattern parameters are arranged to define a measurement gap generation method comprising puncturing data being transmitted, halving a spreading factor, or buffering the data being transmitted onto higher protocol layers.

19. A base station as claimed in claim 17, wherein
the means for defining measurement pattern parameters comprises an algorithm or lookup table configured by software.

* * * * *